United States Patent [19]

Ficalora et al.

[11] 4,005,186

[45] Jan. 25, 1977

[54] METHODS OF INCREASING CATALYTIC ACTIVITY

[76] Inventors: Peter J. Ficalora, R.D. No. 1, Tully, N.Y. 13159; Geoffrey Hao-Wen Liu, 106 Cherry Hill, Dewitt, N.Y. 13214

[22] Filed: Dec. 29, 1975

[21] Appl. No.: 644,629

Related U.S. Application Data

[63] Continuation-in-part of Ser. No. 459,460, April 10, 1974, abandoned.

[52] U.S. Cl. .............................. 423/659; 252/472; 252/477 R
[51] Int. Cl.² ................ B01J 23/74; B01J 35/02; C01G 49/00
[58] Field of Search ............... 252/472, 477 R; 423/659 H

[56] References Cited

UNITED STATES PATENTS

| | | | |
|---|---|---|---|
| 3,746,658 | 7/1973 | Porta et al. | 252/477 R |
| 3,773,894 | 11/1973 | Bernstein et al. | 252/474 X |

*Primary Examiner*—W. J. Shine
*Attorney, Agent, or Firm*—Charles S. McGuire

[57] ABSTRACT

A method of performing chemical reactions with enhanced catalytic activity of a solid body by creating plastic deformations in the surface of the catalyst contacted by the reacting materials. The body of catalytic material is fixedly attached to a substrate or base material capable of being deformed by an electrical or magnetic field. A field is applied of sufficient intensity and proper orientation to deform the base material to an extent producing plastic deformation of the attached catalyst, thereby creating defects in the exposed surface thereof.

7 Claims, 3 Drawing Figures

METHODS OF INCREASING CATALYTIC ACTIVITY

REFERENCE TO RELATED APPLICATION

This is a continuation-in-part of application Ser. No. 459,460, filed Apr. 10, 1974, of the same inventors, now abandoned.

BACKGROUND OF THE INVENTION

The present invention relates to catalytic chemical reactions and, more specifically, to novel methods of performing reactions enhanced with catalytic activity of a solid body of catalytic material.

Many chemical processes, on large commercial scales as well as at the laboratory level, are carried out with the aid of catalysts. Although the exact nature of the catalytic phenomenon is not fully understood, a wide variety of materials have been empirically identified which alter in some manner the chemical reactions of one or more other materials in the presence of the catalyst. For example, nitrogen and hydrogen normally react with one another at an extremely slow rate to form ammonia. However, in the so-called Haber process, when hydrogen and nitrogen are passed over an iron catalyst, doubly promoted with $K_2O$ and $Al_2O_3$ at high temperatures and pressures, the rate at which the two elements react, is greatly enhanced. Consequently, the Haber process is extremely important in the commercial production of ammonia.

Prior experimentation has indicated that the catalytic activity of some solids is based upon the presence of discontinuities or crystal defects, which are contacted by the reacting materials. This enhanced chemical activity (catalysis) occurs at the site of such defects, which may comprise any disturbance of the perfect atomic lattice structure of the catalyst. The present invention is concerned with reactions employing catalysts wherein the property, or one of the properties, of the catalytic body which affects catalytic activity is the presence of surface defects. Although materials exhibiting this property are not commonly grouped in a separately defined class of catalysts, a large number of such materials have been identified, and experimental determination of whether any given material exhibits this property in a particular reaction is relatively simple. For convenience, materials which act as catalysts in at least some reactions wherein catalysis occurs at the site of a defect in the surface contacted by the reacting materials will hereinafter be termed "defect catalysts".

A principal object of the present invention is to provide novel methods for enhancing the level of catalytic activity in defect catalysts.

A further object is to provide a novel method of creating surface defects in a material whose catalytic activity is enhanced by such defects without physically contacting the material.

Another object is to provide a method of rejuvenating a catalyst without removing it from a reactor, or otherwise changing its position.

Still another object is to provide a method of improving the ability of a material to act as a catalyst through the application of electrical and/or magnetic fields.

SUMMARY OF THE INVENTION

A solid body of a defect catalyst is bonded to a base support or substrate of a material capable of being deformed by an electrical or magnetic field. A typical example of such a substrate material is a quartz crystal. The defect catalyst is bonded to the base material over mutually opposing surfaces for example, by being coated directly thereon. When a voltage of sufficient intensity and proper orientation is applied across the quartz crystal, as is well known, the crystal and thereby the bonded body of catalyst will be deformed. The nature of the two materials, catalyst and substrate, is such that the elastic limits of the catalyst are exceeded by the deformation, thus producing a permanent or plastic deformation in the catalyst. This plastic deformation is evidenced by permanent, or essentially permanent, changes in the crystalline lattice structure in portions of the body of the catalyst. Such changes occurring at the surface of the catalyst which is contacted by the reacting chemicals constitute the defects at which catalysis takes place.

DETAILED DESCRIPTION

Figure 1:
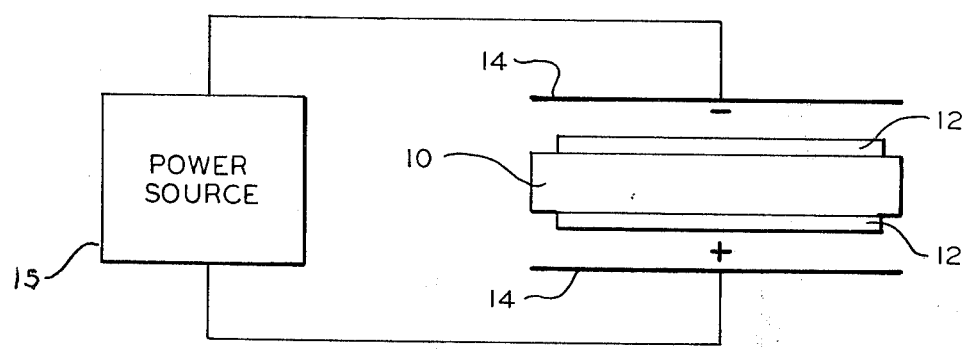
FIG. 1 is a diagrammatic example of an assembly of a catalyst and substrate prepared for use in practising the invention.

Referring now to the drawings, in FIG. 1 is shown a substrate or base 10 having layers of catalytic material 12 fixedly secured to opposite surfaces thereof. Base 10 comprises a solid body of an electrically insulating piezoelectric or magnetically permeable material, i.e., a material capable of being dimensionally changed by an electrical or a magnetic field. Many such materials are well known, this property of piezoelectric materials in particular having been utilized in many applications. The quartz crystal is probably the most widely available and commonly used material in piezoelectric applications and is typical of the materials which may be employed in the present invention as base 10. Other readily apparent examples of materials suitable for such use are Rochelle salt, amonium dihydrogen phosphate, lithium sulfate, barium titanate, and the lead zirconate-lead titanate ceramics.

Catalyst 12 is likewise a body of solid material and, as previously mentioned, is selected from that class of materials previously defined herein as "defect catalysts". Although a very large number of materials are included in this category, a few typical examples are platinum, used as a catalyst in petrochemical processes; nickel, used as a catalyst in the hydrogenation of edible oils; and iron, as previously described in the Haber process of producing ammonia; and alloy thereof Catalyst 12 may be affixed to base 10 by any desired means provided that dimensional changes of the base are transmitted to the catalyst, although not necessarily on a directly proportional basis. A coating of catalyst 12 can be attached directly to base 10 by known coating or depositing techniques. Depending on the particular chemical reaction in which catalyst 12 is utilized, the coating may be in the form of a relatively thin film.

Reference numerals 14 denote a pair of electrodes connected to a suitable electrical energy source 15 for applying a voltage across base 10, assumed in this case to be a quartz crystal, which is an insulator. The position and orientation of electrodes 14 with respect to base 10 is established as a function of the crystallographic orientation of base 10. The crystal must be penetrated by the electrical field in order to be distorted thereby. Electrical continuity between the illustrated catalyst layers on opposite sides of the base will prevent creation of the required voltage gradient across the base. That is, catalyst 12 may essentially cover base 10, if desired, provided that the electrical field may penetrate the base in order to effect the necessary voltage gradient for distortion of the crystal. The catalytic coatings can be used as electodes and connected directly to the electrical energy source.

Figure 2:
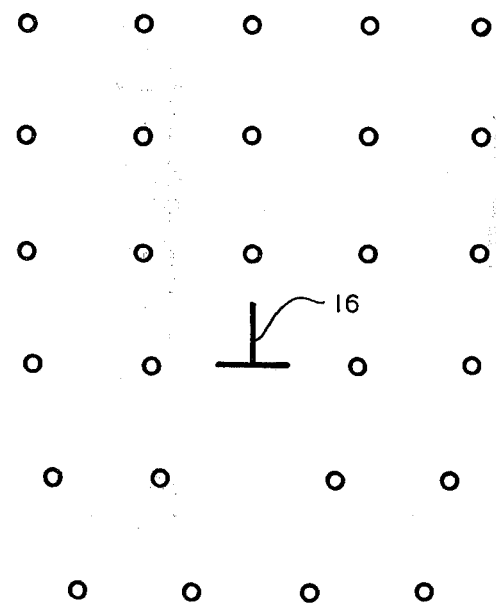
FIG. 2 is an enlarged, diagrammatic illustration of one type of crystalline lattice defect known as an edge dislocation.

Referring now to FIG. 2, each ⁰ represents an atom in a crystal lattice of catalyst 12. The symbol denoted by reference numeral 16 is commonly used to indicate schematically an edge dislocation in a crystal lattice. This type of defect occurs naturally in crystalline materials, and the density of such defects is increased by plastic deformation of the material.

Figure 3:
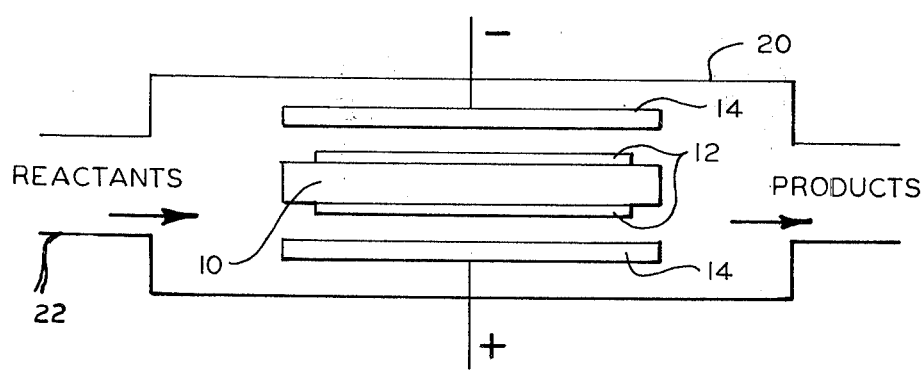
FIG. 3 is a diagrammatic illustration of a typical application of the invention.

In FIG. 3, an enclosed chemical reactor of previously known type is diagrammatically shown and indicated generally by reference numeral 20. Chemical reactants are introduced into reactor 20 at the inlet 22. A material which acts as a catalyst in the reaction is provided in reactor 20, attached to a base support in the manner indicated in FIG. 1. Suitable electrodes or other means for applying a voltage or a magnetic field across the base support for the catalyst are also provided, either within reactor 20 or otherwise suitably positioned with respect to the base material upon which the voltage or the magnetic field acts. Although the illustration shows only a single unit of base material and attached catalyst, in actual practice a large number of such units may be positioned within reactor 20. Also, while the example is directed primarily to the rejuvenation of a catalyst during a reaction, it should be noted that the invention may be applied to enhancing the catalytic ability of a material prior to the utilization thereof in a reaction.

As the reaction proceeds, when the catalyst diminishes in the level of its stimulation of the chemical reaction, the field is applied to effect a distortion of the base support with concomitant plastic deformation of the catalyst, thereby increasing its catalytic ability by the creation of additional defect sites at which catalysis occurs. The catalyst is thereby rejuvenated, and the reaction continues at a high rate.

Although the foregoing example is directed toward an application of the invention wherein an applied voltage is the stimulus which deforms the base material, it is to be noted that a magnetic field applied to a base material responsive thereto may also be employed to effect distortion. The invention depends for its operation on expansion or contraction of the base and attached catalyst to an extent resulting in plastic deformation of the catalyst. While deformation of the base material is normally elastic in nature, within practical limits, the catalyst must necessarily undergo plastic deformation. Thus, upon removal of the stimulus which deforms the base material, the latter will return to its original configuration, but the catalyst will have undergone plastic, or permanent deformation. The minimum strain which must be transmitted from the base to the catalyst in order to generate the defect-producing deformation is a structure dependent property. That is, for any given catalyst the strain or amount of elongation required depends on grain size, the amount and the type of impurity atoms, the number and degree of prior plastic deformation, and the like. Other process variables, such as temperature, frequency of application of the field, etc., may also affect the number of defects resulting from a given deformation.

The intensity of the field required to produce the desired defects in the catalyst may be determined empirically for any given process and material. The elongation imparted to an insulating piezoelectric material, for example, is given as the strength (voltage) of the applied field times the piezoelectric constant of the material. The field may be increased in magnitude and/or frequency until the amount of elongation imparts that amount of deformation to the attached catalytic material to produce the desired density of defects.

It is apparent that the direction of the deformation must be essentially parallel to the attached surfaces of the base and catalyst in order to achieve maximum potential defect density for a given field strength. Also, as previously mentioned, the orientation of the field with respect to crystalline orientation of base 10 will affect the amount of deformation, and thereby defect density, for a given field strength. The base and catalyst may not normally be of the same material since the elastic limits of the catalyst must be exceeded by an elongation within the elastic limits of the base. However, if the catalyst has a different crystalline orientation from that of the base, it is possible to achieve a plastic deformation of the catalyst even though it is of the same material as the base. For example, in the case of quartz, the piezoelectric properties are generally anisotropic. Therefore, a quartz crystal of a given orientation can be deposited as a catalyst on a quartz base of different orientation. The process is preferably carried out at a temperature below the annealing temperature of the catalyst, since the defects would be quickly eliminated by atomic activity at such temperatures. However, if the dislocations are created rapidly enough to maintain a stable configuration for appreciable reaction times, it would still be possible to practise the invention at such elevated temperatures.

What is claimed is:

1. A method of performing a catalytic chemical reaction comprising:
   a. attaching a solid body of a catalyst of the type wherein catalysis occurs at the site of surface defects to a base support material which may be physically deformed by the application of at least one of an electrical and magnetic field, said catalyst and base support being attached over mutually opposing surfaces, whereby physical distortion of said base at said opposing surface is thereof transmitted to said catalyst;
   b. placing said base support with said catalyst attached within a reaction vessel;
   c. applying said field to said base support to a degree sufficient to deform said base to an extent creating plastic deformation defects in an exposed surface of said catalyst;
   d. introducing into said reaction vessel the materials to be reacted for contact with said exposed surface; and
   e. withdrawing the products of the reaction from said vessel.

2. The method according to claim 1 wherein said base support is a piezoelectric material and said field is an electrical field.

3. The method according to claim 2 wherein said base support is quartz.

4. The method according to claim 3 wherein said catalyst is selected from the group consisting of platinum, nickel and iron, and alloys thereof.

5. The method according to claim 1 wherein said base support is a ferromagnetic material and said field is a magnetic field.

6. The method according to claim 1 wherein said base support is deformed within its elastic limits.

7. The method according to claim 1 wherein said base support and catalyst are dissimilar materials.

* * * * *